United States Patent

Bonne

[11] 3,891,309
[45] June 24, 1975

[54] REFLECTIVE ALTERABLE STATE MATERIAL DISPLAY

[75] Inventor: Ulrich Bonne, Hopkins, Minn.

[73] Assignee: Honeywell, Inc., Minneapolis, Minn.

[22] Filed: Dec. 19, 1973

[21] Appl. No.: 426,173

[52] U.S. Cl........ 350/160 R; 350/160 LC; 350/96 B
[51] Int. Cl............................................. G02f 1/28
[58] Field of Search......... 350/160 LC, 160 R, 96 B

[56] References Cited
UNITED STATES PATENTS

| 3,734,598 | 5/1973 | Aiken | 350/160 LC |
| 3,738,942 | 6/1973 | Matsumoto et al. | 350/160 LC |
| 3,748,753 | 7/1973 | Whitcomb et al. | 350/160 LC X |

OTHER PUBLICATIONS
"Liquid-Crystal Cell Having Nonuniform Thickness" by Ludeman, et al., IBM Tech. Discl. Bltn. Vol. 15, No. 4, Sept. 1972 pg. 1349–1350.

Primary Examiner—Ronald L. Wibert
Assistant Examiner—Paul K. Godwin
Attorney, Agent, or Firm—Theodore F. Neils

[57] ABSTRACT

A display device with a selectively alterable state material is provided which operates in the reflective mode. An observer may look directly at the display without seeing his own image because of the geometrical relationship of the reflecting surface and the transparent surface through which the observer looks.

29 Claims, 2 Drawing Figures

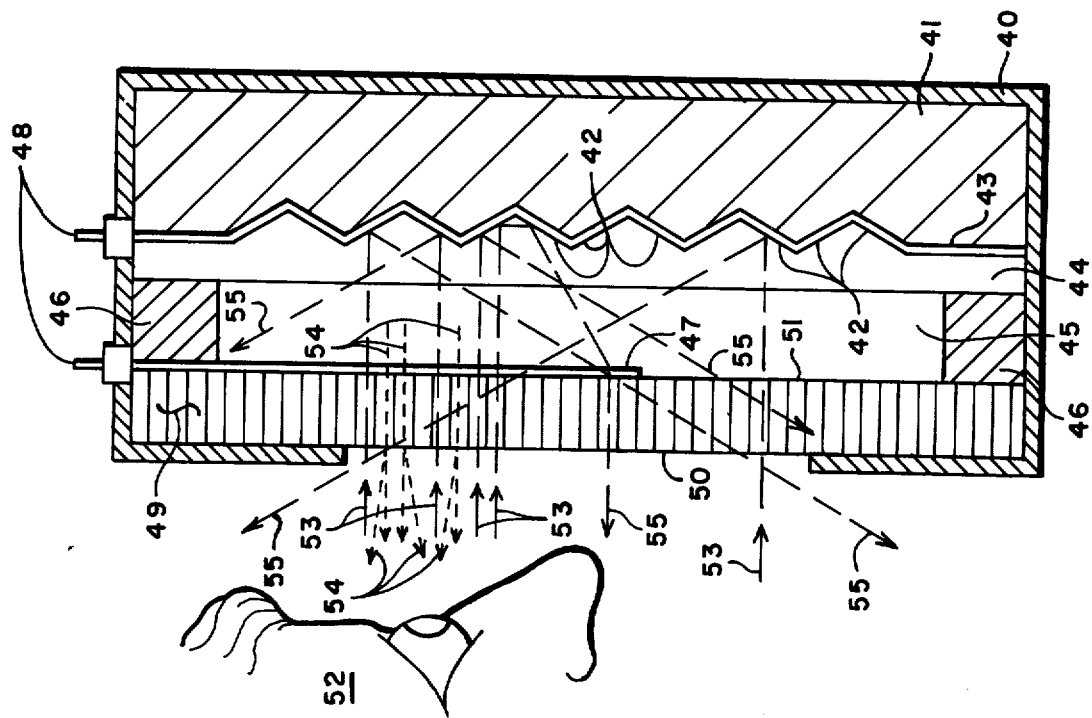
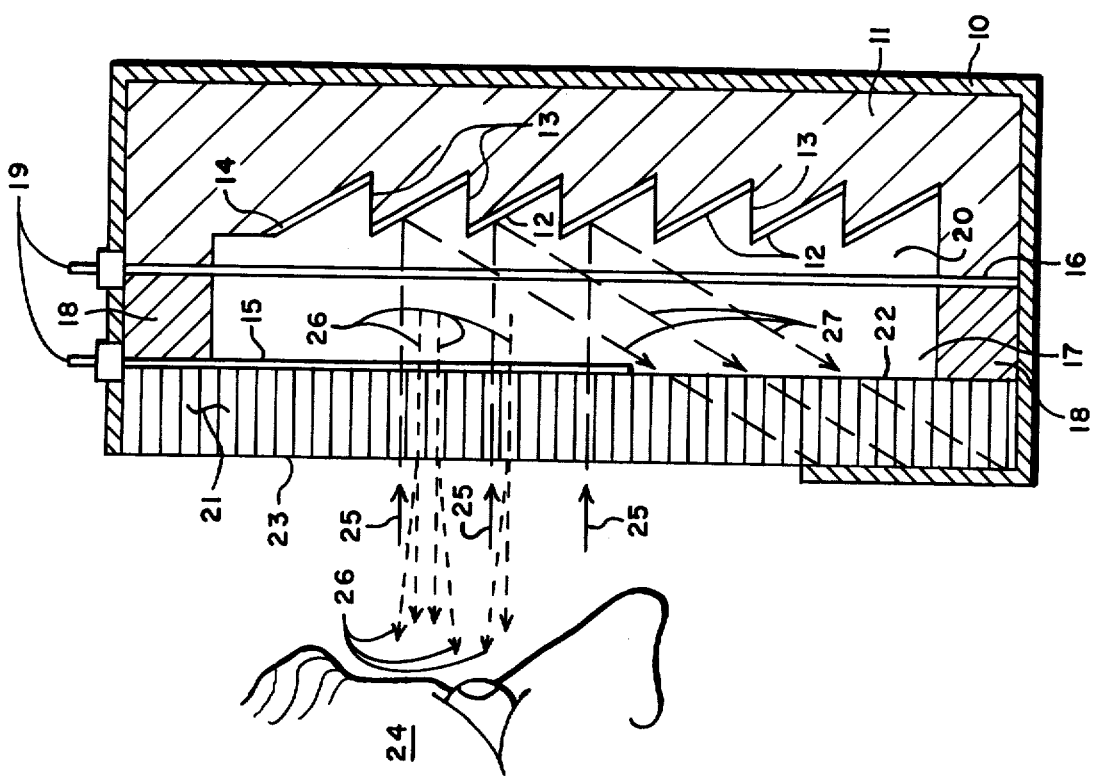

REFLECTIVE ALTERABLE STATE MATERIAL DISPLAY

BACKGROUND OF THE INVENTION

This invention relates to optical display devices to provide changeable visual information from an apparatus and more particularly to displays wherein a state of a material is altered to change the scattering properties of the material. Thereby provided is a pattern for an optical display, visible either directly or after appropriate projection on a screen.

Optical, passive (not self-luminous) display devices based on alterable state materials have received considerable attention because of their low power requirements, potential low cost and potential high reliability. A typical arrangement has the state of an alterable state material controlled by an electric field to the extent of affecting the material light scattering properties. Changing the electric field across the material at some locations alters the state of the material at those locations and so the light scattering properties at those locations. By providing such locations in selected geometric patterns and selectively varying the electric field at some of the pattern locations, a visual display can be provided which corresponds to the selected patterns. Alterable state materials which have such controllable light scattering properties include liquid crystals operating in the dynamic scattering mode and lanthanum modified lead zirconate titanate (PLZT).

One manner of providing a display device utilizing such alterable state material is to provide the material between a transparent electrode and a reflecting surface which also serves as an electrode. The observer and the source of light to be scattered by the material are both located on the side of the device having the transparent electrode. The light passing into the device through the transparent electrode and the alterable state material is caused to be scattered back to the observer from certain locations in the material by providing an appropriate electric field across the alterable state material at those locations. Light passing through other locations in the material and not so scattered must be prevented from reaching the observer's eye by reflection from the reflecting surface if a sufficiently clear image is to be viewed by the observer. The reflecting surface is used to increase the amount of scattering occurring by reflecting the incident light reaching this surface back through the alterable state material including those locations therein which provide the scattering in response to an electric field. This light which is reflected and scattered significantly increases the total light scattered and leads to a substantial improvement in display contrast. Hence a reflecting surface is used behind the alterable state material rather than an absorbing surface even though some provision for preventing reflected and unscattered light from reaching the observer's eye will be required.

The use of a flat reflecting surface places restrictions on the positions of light sources and upon the observer's position if the above requirement concerning reflected and unscattered light is to be met. Particularly, the observer cannot view the display at eye level looking directly into it without also viewing his own image as formed in the reflecting surface. Therefore the observer must view the display obliquely, a rather unsatisfactory arrangement.

SUMMARY OF THE INVENTION

A display device using an alterable state material to scatter and from selected locations therein is provided which operates in the reflective mode. The device has its reflecting surface provided as a series of joined facets. Light, passing substantially perpendicularly through both a transparent wall and the alterable state material, provided between the transparent wall and the reflecting surface, impinges on these facets but is not reflected back through the transparent wall to an observer's eye due to the relative geometrical arrangement of the facets and of the transparent wall. A fiber optic faceplate, having a roughened external surface to produce glare, may be used as the transparent wall to improve display image resolution by reducing light beam divergence from scattering locations in the alterable state material.

BRIEF DESCRIPTION OF THE DRAWINGS

FIG. 1 shows one embodiment of the present invention, and

FIG. 2 shows another embodiment of the present invention.

DESCRIPTION OF THE PREFERRED EMBODIMENTS

In FIG. 1, the display unit is provided in holder 10. Within holder 10 there is provided backing element 11. Backing element 11 has a front surface formed to provide a sawtooth shape in cross section. The slanted portions of this surface, i.e. the angled surfaces of the sawteeth, have a reflecting material deposited thereon to form reflecting facets 12. Several such facets are provided by the sawtooth shape cross section though in some circumstances a single facet may be satisfactory.

The horizontal portions of the sawteeth surfaces have an absorbing material on them to provide absorbing facets 13. Alternatively, the absorbing facets could be transparent so that light impinging on these facets would be transmitted and then reflected from the rearward facing surfaces of reflecting facets 12 and thus keep from the front of the display unit. Reflecting facets 12 plus the absorbing facets 13 together form a surface which will be termed the reflecting surface 14.

Two transparent electrodes, 15 and 16 are shown with a nematic liquid crystal material 17 located therebetween. Spacers 18 keep the transparent electrodes 15 and 16 separated. Transparent electrodes 15 and 16 have external electrical connection means 19 electrically connected thereto. A dielectric transparent plastic filler material 20 is provided between transparent electrode 16 and reflecting surface 14.

A fiber optic faceplate 21 is provided in contact with transparent electrode 15. Typically, transparent electrode 15 is deposited on surface 22 of the fiber optic plate 21 to provide a transparent wall through which incident light passes while transparent electrode 16 is deposited over plastic filler material 20. Reflecting facets 12 must not be diffuse reflectors but rather must not scatter light, typically a mirror surface. However, surface 23 of fiber optic faceplate 21 may be slightly roughened and may have an antireflective coating thereupon, both measures being taken to reduce glare as would otherwise be seen by observer 24.

In operation, an electric field is impressed across liquid crystal material 17 by connecting a voltage source across terminals 19. There may be several transparent electrodes similar to transparent electrode 15 having therewith the appropriate terminal connections arranged in a suitable geometric pattern so that by providing an electric field between selected combinations of these transparent electrodes and transparent electrode 16, a variety of observable optical geometrical patterns result to form various symbols to provide a selectively changing visual display.

Light 25, incident on the display, passes through the faceplate 21, transparent electrode 15, liquid crystal material 17, transparent electrode 16 and transparent plastic filler material 20 to impinge on reflecting surface 14. A portion of that light which passes through transparent electrode 15 on the way to reflecting surface 14 will be scattered back to observer 24, through transparent electrode 15 and faceplate 21, by liquid crystal material 17, between electrodes 15 and 16, if electrode 15 is energized with respect to electrode 16 to establish an electric field. Such scattered light is labeled 26 in FIG. 1. This scattering of light occurs because liquid crystal material 17 is placed in the dynamic scattering state by the application of a sufficient electric field across it. Where there is no sufficient electric field across liquid crystal material 17 there is no substantial scattering of light. Thus, a light area-dark area pattern will be established which can be seen by observer 24 looking at the display, the light areas occurring where scattering occurs in liquid crystal material 17.

The portion of light 25 remaining unscattered, after passing through liquid crystal material 17 and transparent electrode 16, and impinging on reflecting surface 14 is reflected by the reflecting facets 12 in surface 14. Such reflected light is labeled 27 in FIG. 1. Some of the reflected light 27 will pass through the liquid crystal material 17 at those locations where a sufficient electric field to induce dynamic scattering exists, as mentioned above, and some of reflected light 27 will pass through other portions of liquid crystal material 17. Where reflected light 27 passes through portions of liquid crystal material 17 that is subjected to this sufficient electric field, that light will be scattered in part back to observer 24 through transparent electrode 15 and faceplate 21. The scattering of the reflected light in addition to the directly incident light serves to improve the visual contrast in the display between the portions of the liquid crystal material 17 having an electric field impressed thereacross to appear as a light area and the portions thereof not subjected to such a field and appearing as dark areas, as seen by observer 24.

The portion of reflected light 27 which is not scattered back to the observer 24 is of particular concern. In conventional liquid crystal displays the reflecting surface 14 is a flat surface serving as a flat mirror. In such a case, the observer looking into the display directly sees his own image in the flat reflecting surface which interferes with his viewing of the geometrical patterns displayed resulting in a degraded visual display.

To enable observer 24 to peer directly into the display without seeing his own image, reflecting surface 14 has been constructed of several facets as stated above. Reflecting facets 12 are given in angular relationship with surface 22 of faceplate 21 and transparent electrode 15. Thus, light passing substantially perpendicularly across surface 22 and through transparent electrode 15 and thereafter impinging on reflecting facet 12 will not be reflected directly back to observer 24, but rather will be reflected either into a portion of holder 10, outside the display through faceplate 21 well below the eye of observer 24 or into absorbing facets 13. As a result, observer 24 cannot see his image in reflecting surface 14 while looking more or less directly into the display which is the position giving the fullest view of a displayed symbol. This result is best obtained with the light source providing light 25 being located above or behind the observer 24.

As stated above, faceplate 21 is a fiber optic faceplate preferably having a slightly roughened surface 23 with an antireflecting coating thereon. A sheet glass plate could be used in place of fiber optic faceplate 21, providing the sheet glass plate with a roughened surface and an antireflective coating also. Because the geometrical pattern displayed comes from behind the faceplate, there may occur a significant loss in resolution through use of merely a sheet glass plate having a slightly roughened surface due to the divergence of light coming from the geometrical pattern acting in conjunction with the scattering effect of the roughened surface. By use of a fiber optic faceplate 21, a reduced loss in resolution can be obtained due to divergence of the light coming from the displayed symbol being reduced since the fiber optic faceplate acts to transfer the displayed symbol to its front surface 23. Therefore the use of a fiber optic faceplate means that there will be only a slight contrast loss due to a slight increase in background scattering caused by the roughened surface 23.

Turning now to FIG. 2, another embodiment of the invention is shown. Again there is a holder 40 and a backing material 41. A reflective material which is also electrically conductive has been deposited on backing material 41 to form reflecting facets 42. These facets 42 together make up reflecting surface 43 and are so disposed relative to one another to give this surface a triangular cross section. A dielectric material 44 is shown between reflecting surface 43 and liquid crystal material 45. Two spacers 46 are used to provide a cavity for liquid crystal material 45. Terminals 48 provide electrical connections to transparent electrode 47 and to the reflective material making up reflecting surface 43. Again a fiber optic faceplate 49 is shown having surfaces 50 and 51. Surface 50 can again be roughened and covered with an antireflective coating to reduce glare to observer 52.

Operation does not differ appreciably from operation of the display shown in FIG. 1, but some changes are made to increase display brightness and to reduce cost. However, this is achieved only at some reduction of resolution. Terminals 48 must be energized by a sufficient voltage difference to create a sufficient electric field to cause scattering in the liquid crystal material 45 disposed between transparent electrode 47 and reflecting surface 43. Again, there may be several transparent electrodes similar to 47 which may be selectively energized to provide various symbol displays.

Again light 53 impinges on surface 50 and passes through fiber optic faceplate 49, transparent electrode 47, liquid crystal material 45, dielectric material 44 to impinge on reflecting facets 42. Scattered light 54 results as does reflected light 55. Reflecting surface 43 has a triangular cross sectional geometry in this display with no absorbing facets therein. Therefore all of the light incident on the reflecting surface 43 is reflected away therefrom through liquid crystal material 45 to provide a somewhat brighter display. This is because none of the light is absorbed before passing once again through liquid crystal material 45 including any light scattering locations provided therein which will act to scatter a portion of this reflected light also. However because of double reflection from two obliquely facing reflecting facets 42 some unwanted reflected but unscattered light will reach observer 52 in some positions and a divergence of the light traveling from the geometrical image to observer 52 will be increased somewhat lowering resolution.

Because of the use of dielectric material 44 alternating current energization will be required to operate this display whereas either alternating current or direct current energization will operate the display of FIG. 1. Transparent dielectric material 44 is used to smooth out differences in the electric field which differences will appear across liquid crystal material 45 at locations at which an electric field is provided therein due to the use of the material of reflecting surface 43 as an electrode. This variation in electric field across liquid crystal material 45, occurring lengthwise along the liquid crystal material in FIG. 2 beside electrode 47, is the result of the varying distance between transparent electrode 47 and reflecting surface 43 which in turn is the result of the cross sectional triangular geometry thereof. Use of alternating current energization results in operating the display in somewhat the manner of a capacitor with liquid crystal material 45 a part of the capacitor dielectric and with material 45 located some distance from electrode 47. The result is that the electric field across the liquid crystal material 55 exhibits a relatively more uniform nature as the thickness of dielectric material 44 increases making the local geometry of reflecting surface 44 more and more negligible.

There is also the possibility of using the display of FIG. 2 without using dielectric material 44 at all. If the triangular geometry of reflecting surface 43 is made very small the variation in distance between transparent electrode 47 and reflecting surface 43 can be made relatively negligible. As a result, the electric field across the liquid crystal material 45 beside electrode 47, which would now be in contact with reflecting surface 43, would not vary appreciably along its length. The small difference in scattering leading to something of a striped effect in the displayed symbols due to the small variation in the electric field along liquid crystal material 45 would not be or would nearly not be resolvable by observer 52. Eliminating dielectric material 44 would allow the display to be operated by direct current energization.

The embodiments of the invention in which an exclusive property or right is claimed are defined as follows:

1. A display device containing therein an alterable state material capable of having a material state thereof selectively altered locally to thereby alter, at that location, scattering properties of said alterable state material with respect to impinging light, said device comprising:
a transparent wall having a transmitting surface therein;
reflecting surface means joined substantially across its surface to a first electrode by a solid body extending therebetween and exposed to said light passing through said transmitting surface, said reflecting surface means reflecting that light which has passed substantially perpendicularly through said transmitting surface to impinge on said reflecting surface means from an incident direction in directions other than said incident direction; and
said alterable state material disposed between said transparent wall and said reflecting surface means so that light in passing perpendicularly through said transmitting surface to impinge on said reflecting surface means also passes through said alterable state material.

2. The device of claim 1 wherein a second transparent electrode is a part of said transparent wall and said first electrode and said reflecting surface means are joined as said by a transparent dielectric material disposed therebetween.

3. The device of claim 2 wherein said transmitting surface is a part of said second transparent electrode.

4. The device of claim 3 wherein said transparent wall includes a fiber optic face plate.

5. A display device containing therein an alterable state material capable of having a material state thereof selectively altered locally to thereby alter, at that location, scattering properties of said alterable state material with respect to impinging light, said device comprising:
a transparent wall having a transmitting surface therein and which includes a fiber optic faceplate;
reflecting surface means exposed to said light passing through said transmitting surface, said reflecting surface means reflecting that light which has passed substantially perpendicularly through said transmitting surface to impinge on said reflecting surface means from an incident direction in directions other than said incident direction; and
said alterable state material disposed between said transparent wall and said reflecting surface means so that light in passing perpendicularly through said transmitting surface to impinge on said reflecting surface means also passes through said alterable state material.

6. A display device containing therein an alterable state material capable of having a material state thereof selectively altered locally to thereby alter, at that location, scattering properties of said alterable state material with respect to impinging light, said device comprising:
a transparent wall having a transmitting surface therein;
a reflecting surface joined substantially thereacross to a first electrode by a solid body extending therebetween and having one or more facets thereof exposed to said light passing through said transmitting surface with said facets positioned so that a part of said light, which passes through a portion of said transmitting surface and which both passes substantially perpendicular to said portion and impinges on at least one of said facets, is reflected by said one of said facets in directions other than toward said portion; and
said alterable state material disposed between said transparent wall and said reflecting surface so that said light in passing through said transmitting surface to impinge on said one of said facets also passes through said alterable state material.

7. The device of claim 6 wherein a second transparent electrode is a part of said transparent wall and said first electrode and said reflecting surface are joined as said by a transparent dielectric material disposed therebetween.

8. The device of claim 7 wherein said transmitting surface is a part of said second transparent electrode.

9. The device of claim 8 wherein said transparent wall includes a fiber optic face plate.

10. The device of claim 6 wherein there is a plurality of said facets and one or more of said facets reflects none of said light impinging thereon.

11. A display device containing therein an alterable state material capable of having a material state thereof selectively altered locally to thereby alter, at that location, scattering properties of said alterable state material with respect to impinging light, said device comprising:
- a transparent wall having a transmitting surface therein and which includes a fiber optic faceplate;
- a reflecting surface joined substantially thereacross to a first electrode and having one or more facets thereof exposed to said light passing through said transmitting surface with said facets positioned so that a part of said light, which passes through a portion of said transmitting surface and which both passes substantially perpendicular to said portion and impinges on at least one of said facets, is reflected by said one of said facets in directions other than toward said portion; and
- said alterable state material disposed between said transparent wall and said reflecting surface so that said light in passing through said transmitting surface to impinge on said one of said facets also passes through said alterable state material.

12. A display device containing therein an alterable state material capable of having a material state thereof selectively altered locally to thereby alter, at that location, scattering properties of said alterable state material with respect to impinging light, said device comprising:
- a transparent wall having a transmitting surface therein;
- a reflecting surface joined substantially thereacross to a first electrode by a solid body extending therebetween and having one or more facets, said reflecting surface being exposed to said light passing through said transmitting surface with said reflecting surface being nonparallel with said transmitting surface, and
- said alterable state material disposed between said transparent wall and said reflecting surface so that light in passing through said transmitting surface to impinge on said reflecting surface also passes through said alterable state material.

13. The device of claim 12 wherein a second transparent electrode is a part of said transparent wall and said first electrode and said reflecting surface are joined as said by a transparent dielectric material disposed therebetween.

14. The device of claim 13 wherein said transmitting surface is a part of said second transparent electrode.

15. The device of claim 14 wherein said transparent wall includes a fiber optic face plate.

16. The device of claim 12 wherein there is a plurality of said facets and one or more of said facets reflects none of said light impinging thereon.

17. A display device containing therein an alterable state material capable of having a material state thereof selectively altered locally to thereby alter, at that location, scattering properties of said alterable state material with respect to impinging light, said device comprising:
- a transparent wall having a transmitting surface therein and which includes a fiber optic faceplate;
- a reflecting surface joined substantially thereacross to a first electrode andd having one or more facets, said reflecting surface being exposed to said light passing through said transmitting surface with said reflecting surface being nonparallel with said transmitting surface, and
- said alterable state material disposed between said transparent wall and said reflecting surface so that light in passing through said transmitting surface to impinge on said reflecting surface also passes through said alterable state material.

18. A display device containing therein an alterable state material capable of having a material state thereof selectively altered locally to thereby alter, at that location, scattering properties of said alterable state material with respect to impinging light, said device comprising:
- a transparent wall having a transmitting surface therein;
- reflecting surface means, serving also as a first electrode, exposed to said light passing through said transmitting surface, said reflecting surface means reflecting that light which has passed substantially perpendicularly through said transmitting surface to impinge on said reflecting surface means from an incident direction in directions other than said incident direction; and
- said alterable state material disposed between said transparent wall and said reflecting surface means so that light in passing perpendicularly through said transmitting surface to impinge on said reflecting surface means also passes through said alterable state material.

19. The device of claim 18 wherein a transparent dielectric material is disposed between said alterable state material and said reflecting surface means.

20. The device of claim 18 wherein said transmitting surface is a part of said second transparent electrode.

21. The device of claim 20 wherein said transparent wall includes a fiber optic face plate.

22. A display device containing therein an alterable state material capable of having a material state thereof selectively altered locally to thereby alter, at that location, scattering properties of said alterable state material with respect to impinging light, said device comprising:
- a transparent wall having a transmitting surface therein;
- a reflecting surface, serving also as a first electrode, having one or more facets thereof exposed to said light passing through said transmitting surface with said facets positioned so that a part of said light, which passes through a portion of said transmitting surface and which both passes substantially perpendicular to said portion and impinges on at least one of said facets, is reflected by said one of said facets in directions other than toward said portion; and said alterable state material disposed between said transparent wall and said reflecting surface so that said light in passing through said transmitting surface to impinge on said one of said facets also passes through said alterable state material.

23. The device of claim 22 wherein a transparent dielectric material is disposed between said alterable state material and said reflecting surface.

24. The device of claim 22 wherein said transmitting surface is a part of said second transparent electrode.

25. The device of claim 24 wherein said transparent wall includes a fiber optic face plate.

26. A display device containing therein an alterable state material capable of having a material state thereof selectively altered locally to thereby alter, at that location, scattering properties of said alterable state material with respect to impinging light, said device comprising:

a transparent wall having a transmitting surface therein;

a reflecting surface, serving also as a first electrode, having one or more facets, said reflecting surface being exposed to said light passing through said transmitting surface with said reflecting surface being nonparallel with said transmitting surface, and said alterable state material disposed between said transparent wall and said reflecting surface so that light in passing through said transmitting surface to impinge on said reflecting surface also passes through said alterable state material.

27. The device of claim 26 wherein a transparent dielectric material is disposed between said alterable state material and said reflecting surface.

28. The device of claim 26 wherein said transmitting surface is a part of said second transparent electrode.

29. The device of claim 28 wherein said transparent wall includes a fiber optic face plate.

* * * * *